US009021113B2

(12) United States Patent
Carr et al.

(10) Patent No.: US 9,021,113 B2
(45) Date of Patent: Apr. 28, 2015

(54) INTER-SERVICE SHARING OF CONTENT BETWEEN USERS FROM DIFFERENT SOCIAL NETWORKS

(75) Inventors: Derek Wayne Carr, Apex, NC (US); Thomas Schaeck, Achern (DE); Andrew Bryan Smith, Morrisville, NC (US); Michael C. Wanderski, Durham, NC (US); Mark Douglas Weitzel, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 13/163,541

(22) Filed: Jun. 17, 2011

(65) Prior Publication Data

US 2012/0324121 A1 Dec. 20, 2012

(51) Int. Cl.
*G06F 15/16* (2006.01)
*G06Q 50/00* (2012.01)

(52) U.S. Cl.
CPC ...................................... *G06Q 50/01* (2013.01)

(58) Field of Classification Search
CPC ........ H04L 12/58; H04L 63/083; H04L 63/18
USPC .......................................................... 709/229
See application file for complete search history.

(56) References Cited

U.S. PATENT DOCUMENTS

2002/0113703 A1* 8/2002 Moskowitz et al. ....... 340/568.1
2005/0216550 A1 9/2005 Paseman et al.
2008/0319943 A1* 12/2008 Fischer ............................. 707/3
2009/0271247 A1* 10/2009 Karelin et al. .................. 705/10
2009/0292814 A1* 11/2009 Ting et al. ...................... 709/229
2010/0114788 A1* 5/2010 White et al. .................. 705/319
2010/0235625 A1* 9/2010 Pandey ......................... 713/156
2010/0318925 A1* 12/2010 Sethi et al. .................... 715/760
2011/0023101 A1 1/2011 Vernal et al.
2011/0023129 A1 1/2011 Vernal et al.
2011/0129120 A1* 6/2011 Chan ............................. 382/103
2011/0258535 A1* 10/2011 Adler et al. ................... 715/235
2012/0066613 A1* 3/2012 Berger .......................... 715/751
2012/0150729 A1* 6/2012 Isaacson et al. ................ 705/39
2012/0185779 A1* 7/2012 Dugan et al. .................. 715/739
2012/0221400 A1* 8/2012 Tietzen ...................... 705/14.27

OTHER PUBLICATIONS

Guinard et al "Sharing Using Social Networks ina Composable Web of Things", 2010, IEEE, all pages.*
Ko et al, "Social-Networks connect services", 2010, IEEE, all pages.*

* cited by examiner

*Primary Examiner* — Hua Fan
(74) *Attorney, Agent, or Firm* — Steven L. Nichols; Van Cott, Bagley, Cornwall & McCarthy P.C.

(57) ABSTRACT

Sharing content between users of different social networks includes: in a source social network implemented by at least one processor, receiving shared content uploaded by a source user with an indication of a number of recipients of the shared content; establishing a trusted communication link between the source social network and at least one external social network; and allowing the number of recipients to retrieve the shared content from the source social network via the trusted communication link.

21 Claims, 5 Drawing Sheets

INTER-SERVICE SHARING OF CONTENT BETWEEN USERS FROM DIFFERENT SOCIAL NETWORKS

BACKGROUND

Aspects of the present disclosure relate generally to sharing electronic messages and media content over social networks, and more particularly, to a unified system and method for sharing content throughout multiple disparate social networks.

With the advent of email, distribution of electronic information to large groups of users became a common occurrence in both the professional and personal sectors. Social networking has changed the way users share electronic information and media content. A social network is defined as a web service that enables a user to interact with other users that are trusted. These social networks, in addition to allowing users to communicate with one another, also allow users to upload media content to the social network server where users from the same social network may view and access the media content. Because each social network has developed distinct sharing protocols and user profile directories, the variety of protocols for storing and distributing electronic information and media content are as numerous as the social networks that utilize them.

BRIEF SUMMARY

A method for sharing content between users in different social networks includes: in a source social network implemented by at least one processor, receiving shared content uploaded by a source user with an indication of a number of recipients of the shared content; establishing a trusted communication link between the source social network and at least one external social network; and allowing said recipients to retrieve the shared content from the source social network via the trusted communication link.

A system, including: at least one processor; and a memory communicatively coupled to the at least one processor. The memory includes executable code that causes the at least one processor, when executing the executable code, to: implement a source social network; receive shared content uploaded by a source user with an indication of a number of recipients of the shared content; establish a trusted communication link between the source social network and at least one external social network; and allow the recipients to retrieve the shared content from the source social network via the trusted communication link.

A computer program product for sharing content between users in different social networks, the computer program product includes a computer readable storage medium having computer readable code embodied therewith. The computer readable program code includes: computer readable program code configured to implement a source social network; computer readable program code configured to receive shared content uploaded by a source user with an indication of a number of recipients of the shared content; computer readable program code configured to establish a trusted communication link between the source social network and at least one external social network; and computer readable program code configured to allow the recipients to retrieve the shared content from the source social network via the trusted communication link.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
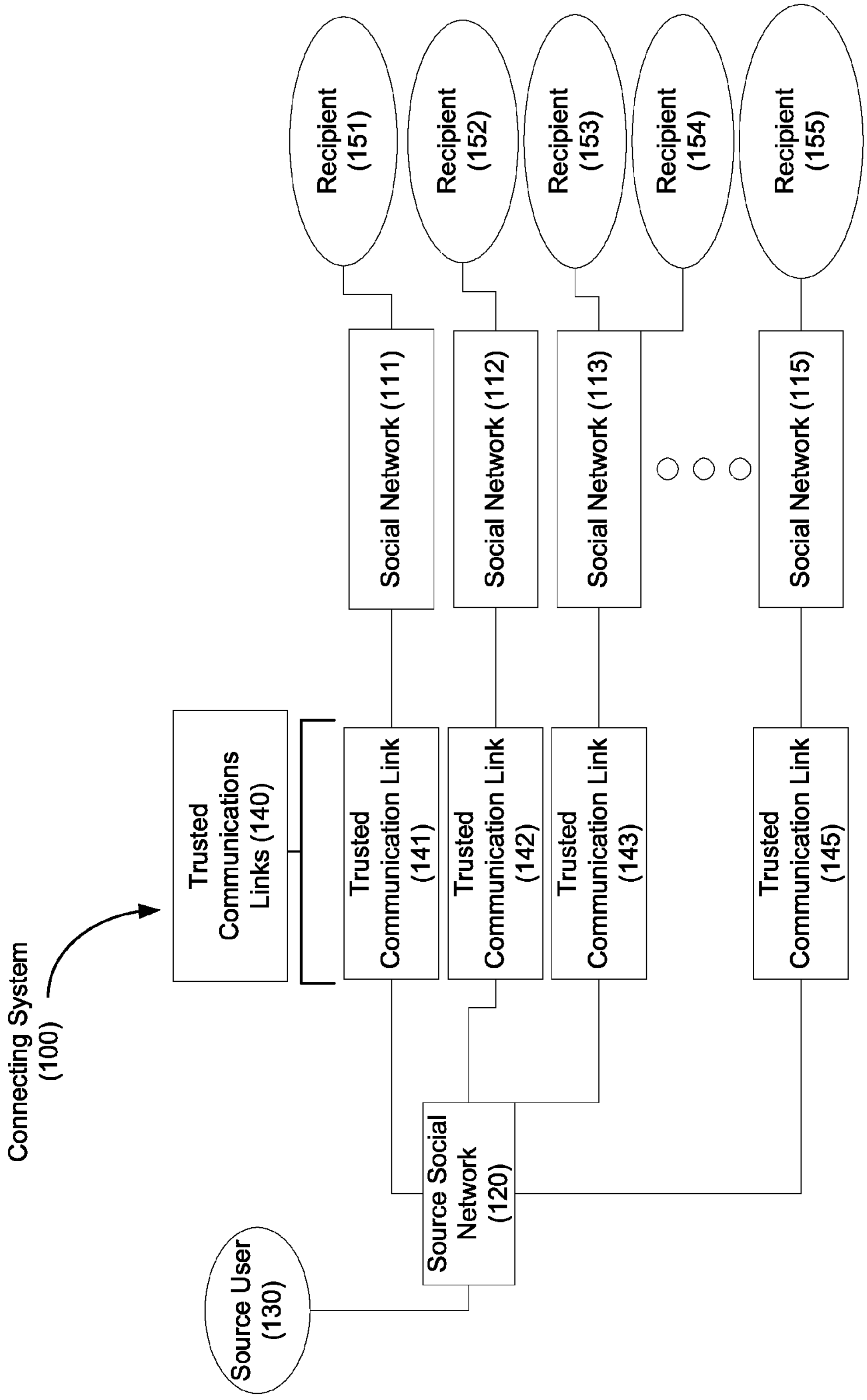
FIG. 1 is a diagram showing an illustrative system for securely connecting users on different social networks, according to one exemplary embodiment of principles herein described.

The increasing demand for social connection has fostered the development of numerous social networks. However, the development of varied social networks in part inhibits the purpose for which they were created, that is to create a forum where users can share media content and corroborate with others throughout the entire world. With the variety of social networks utilized, a user desiring to share content with multiple individuals who utilize different social networks must comply with the varied sharing protocols and distinct profile directories. Content shared across multiple social networks is also at an increased risk of security breach. In light of these and other issues, the present specification discloses a method and system for securely sharing content between users of different social networks.

According to certain illustrative examples, the present specification discloses a method and system wherein a user may upload selected shared content to a single source social network and select recipients of the shared content. A trusted communication link may then be established, wherein a plurality of social networks, one of which is the source social network, may exchange information and provide access to shared content that exists on their respective servers. A system may then direct recipients to the shared content located on the source social network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "metadata" refers to any data information pertaining to a particular user's actions and relationships with regards to creating, uploading, sharing, and downloading shared content from associated social networks.

Throughout this specification and in the appended claims, the term "shared content" refers to information stored by a social network that can be accessed through the social network by authorized users. Such shared content includes but is not limited to documents, posts, and images.

Throughout this specification and in the appended claims, the term "social network" refers to a system of individual computers electronically connected to one another that permits users to communicate with one another and share content through the social network's server.

Referring now to the figures, FIG. 1 is a diagram of an illustrative system (100) for connecting a plurality of social networks. According to certain illustrative examples, the system may include a source social network (120) communicatively coupled to multiple external social networks (111, 112, 113, 115) through a plurality of respective trusted communication links (141, 142, 143, 145). A source user (130) may have an account with the source social network (120), and a number of recipient users (151, 152, 153, 154, 155) may have respective accounts with the external social networks. The source social network (120) may be designated as an endpoint for the source user (130) to upload and store shared content. The source social network (120) may manage and store shared content uploaded by the source user (130). For example, the source social network (120) may implement an electronic content management system, which provides an interface to the source user (130) for uploading and sharing content associated with an account of the source user (130) on the source social network (120). The source social network (120) may also manage and store metadata pertaining to a source user's (130) actions and relationships with regards to creating, uploading, sharing, and downloading shared content from associated social networks. Examples of this information include but are not limited to quantity, history, and titles of uploads and downloads.

The individual trusted communications links (141, 142, 143, 145) may provide secure communications between the external social networks (111, 112, 113, 115) and the source social network (120). In certain examples, the individual trusted communication links (141, 142, 143, 145) may be established through a social network authentication system with which the external social networks (111, 112, 113, 115) within the plurality of social networks (110) and the source social network (120) are compliant. For example, the individual trusted communication links (141, 142, 143, 145) may be established through an established technical protocol such as OpenID to identify the credentials of the external social networks (111, 112, 113, 115) within the plurality of social networks (110) and conditionally grant access to the various external social networks (111, 112, 113, 115) based on the authenticity of the credentials. In another example, the individual trusted communication links (141, 142, 143, 145) may be established using an established technical standard such as OAuth to authenticate and permit data access across the plurality of social networks (110). Such systems may increase the security of sharing within the plurality of social networks (110). In one example, the individual trusted communication links (141, 142, 143, 145) may be established by the source social network (120). In another example, the individual trusted communication links (141, 142, 143, 145) may be established by a trusted intermediary.

Figure 2:
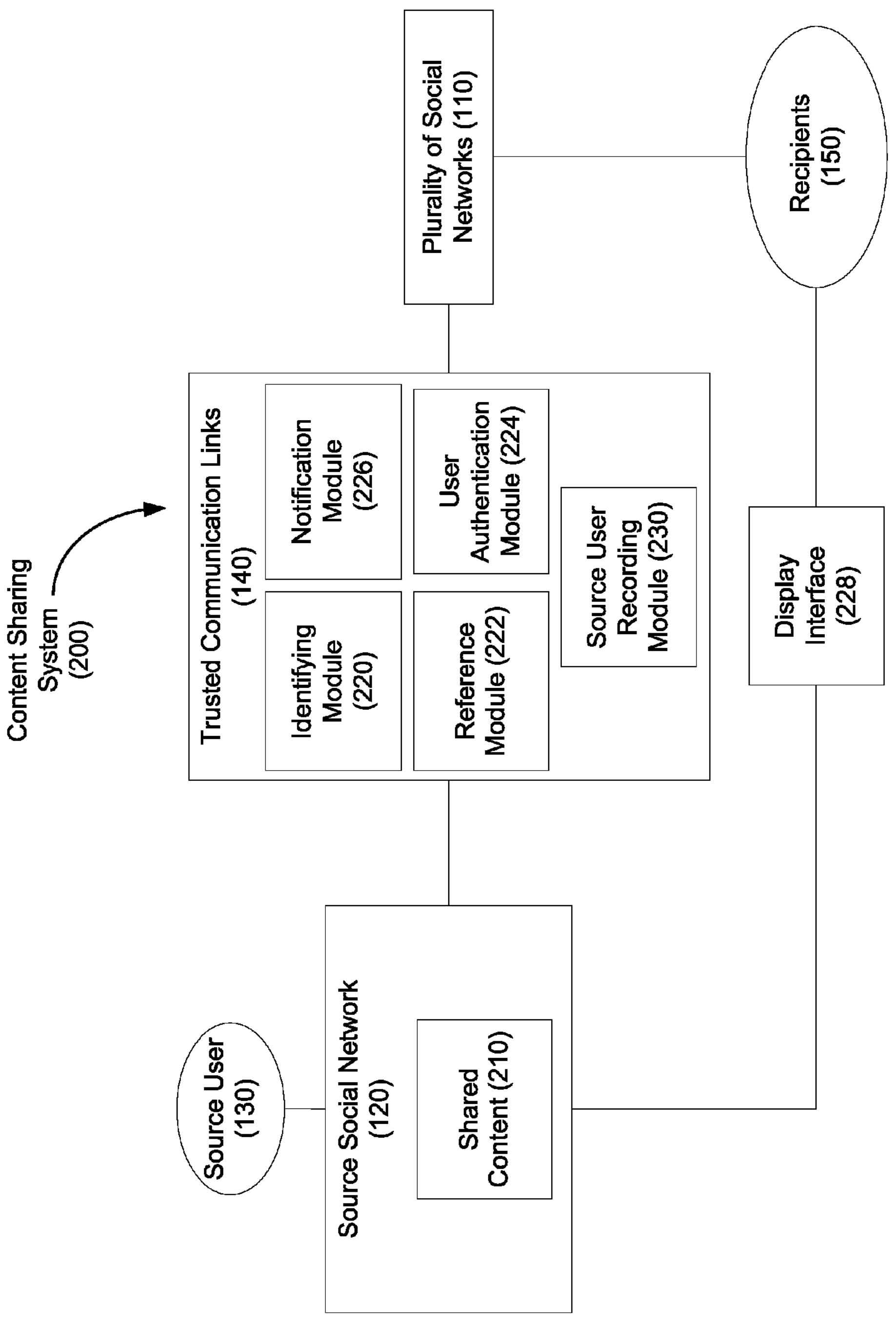
FIG. 2 is a diagram showing an illustrative system for sharing content on a source social network, according to one exemplary embodiment of principles herein described.

FIG. 2 is a block diagram illustrating a system (200) for sharing content to the plurality of social networks (110). The system may include a source social network (120) configured to manage and store shared content (210) uploaded by a source user (130), to be shared across the plurality of social networks (110) through the trusted communication links (140). This shared content (210) may be stored on the source social network (120). For example, the source social network may implement an electronic content management system to facilitate and manage uploading and storing of a source user's (130) shared content.

The source social network (120) may also allow for creation of certain source user-established access control limitations. These access control limitations may alter the sharing, accessing, and management activities of the shared content (210). Examples of these access control limitations include, but are not limited to, types of content shared, categories of content shared, and recipient access limitations, such as edit-only rights, read-only rights, and the like.

The system may also include an identifying module (220) wherein users of the plurality of social networks (110) may be identified within the external social networks (FIG. 1, 111, 112, 113, 115) of the plurality of social networks (110). Once identified, the user's identity may be provided to the source user (130) to be selected as recipients (150). For example, the identifying module (220) may be configured such that a source social network (120) may identify recipients (150) according to an external social network's (FIG. 1, 111, 112, 113, 115) unique user identifier. The identifiers may particularly characterize the users in a particular external social network (FIG. 1, 111, 112, 113, 115) within the plurality of social networks (110). Examples of the identifiers may include, but are not limited to standards such as Opensocial, WebFinger, etc. In one example, the identifying module (220) may store the identifying information of various users on the source social network (120) to be referenced in future sharing activities. The identifying module (220) may also permit a source user (130) to impose the access control limitations on the individual recipients (FIG. 1, 151, 152, 153, 154, 155).

Additionally, the system (200) may include a reference module (222) for directing recipients (150) to the shared content (210) located on the source social network (120). The reference module (222) may, for example, generate a navigating link which directs recipients (150) to the location of the shared content (210) on the source social network (120). The navigating link may be provided to the recipients (150). Such a reference module (222) may increase efficiency in the content sharing system (200) as shared content (210) may be stored on one single social network within the plurality of social networks (110).

In certain examples, the system may also include a user authentication module (224) to verify that recipients (150) are authorized to access the shared content (210). This user authentication module (224) may enforce certain source user (130) imposed access control limitations. In certain examples, this user authentication module (224) may be separate and distinct from the trusted communication links (140). An example of a user authentication module (224) may require recipients (150) to enter a password to access the shared content. Upon verification of the password by the source social network (120), recipients (150) are granted access to the shared content (210). In certain examples, the user authentication module (224) may be managed by a trusted intermediary. Additionally or alternatively, the user authentication module (224) may utilize a verification protocol such as WebFinger to authenticate certain characteristics of the recipients (150), such as the recipients' (150) email addresses.

The content sharing system (200) may further include a notification module (226) through which a source user (130) may notify the recipients (150) through the trusted communication links (140) that shared content (210) from the source user (120) is available to them.

The notification module (226) may be established through the trusted communication links (140) and displayed to recipients (150) through an electronic display interface (228). An example of the display interface (228) includes but is not limited to text, or a symbol displayed on any type of electronic device, indicating that shared content (210) is available to the recipients (150). In one example, the notification module (226) may display certain information relating to the context of the shared content, which may include, but is not limited to, a title of the shared content, a description of the shared content, a publication date of the shared content, any access control limitations, etc. The display interface (228) may be established by the source social network (120) or a trusted intermediary.

Additionally, the trusted communication links (140) may include a source user recording module (230) wherein certain metadata (as described above) relating to the source user's (130) interaction with the shared content (210) may be memorialized. The metadata may then be appended to a user's existing metadata and stored on the source social network (120).

Figure 3:
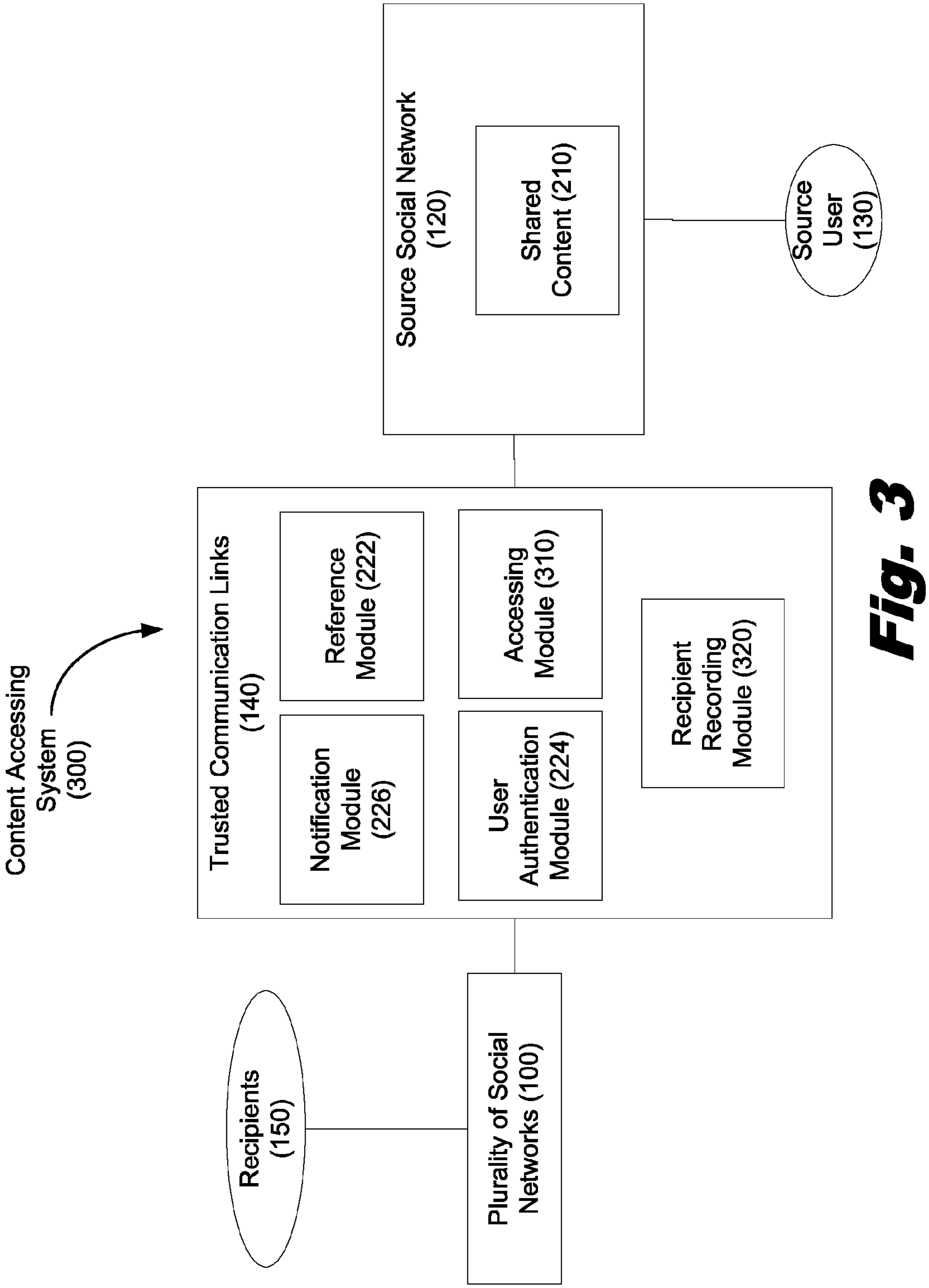
FIG. 3 is a diagram showing an illustrative system for accessing shared content on a source social network, according to one exemplary embodiment of principles described herein.

FIG. 3 is a block diagram illustrating a system (300) for permitting recipients (150) to access shared content (210). For example, as described above, once recipients (150) have been identified and selected by the source user (130), and the shared content (210) has been uploaded to a source social network (120), recipients (150) may access the shared content (210) located on the source social network (120).

In one example, recipients (150) may be notified that shared content (210) is available to the recipients (150) through the notification module (226). The reference module (222) may then direct the recipients (150) to the location of the shared content (210) on the source server (120).

In certain examples, the system (300) may utilize the user authentication module (224) wherein the external social networks (FIG. 1, 111, 112, 113, 115) within the plurality of social networks (110) are verified and the recipients (150) are likewise authorized to access the shared content (210). For example, the user authentication module (224) may require password verification before directing the recipients (150) to the shared content (210). The user authentication module (224) may also enforce the user-established access control limitations. An example of the authentication module (224) may include a lock-out module wherein a user who is not a recipient (150) is prohibited access to the shared content (210). A further example of the authentication module (224) may notify a source user (130) of activity by the lock-out module.

Additionally, recipients (150) may access the shared content (210) through an accessing module (310) wherein an external social network (FIG. 1, 111, 112, 113, 115) within the plurality of social networks (110) gains access from the source social network (120) to permit the recipients (150) to access the shared content. An example of such an accessing module (310) may implement established technical standards such as Content Management Interoperability Services.

Once recipients (150) and the associated external social network (FIG. 1, 111, 112, 113, 114) are verified, recipients (150) may then be directed to the location on the source social network (120) wherein the shared content (210) is located.

An illustrative example of the system (300) may further include a recipient recording module (320) which records the metadata (as described above) pertaining to the activity of the individual recipient (FIG. 1, 151, 152, 153, 154, 155) relating to the shared content (210) and appends it to the individual recipient's (FIG. 1, 151, 152, 153, 154, 155) existing metadata.

Figure 4:
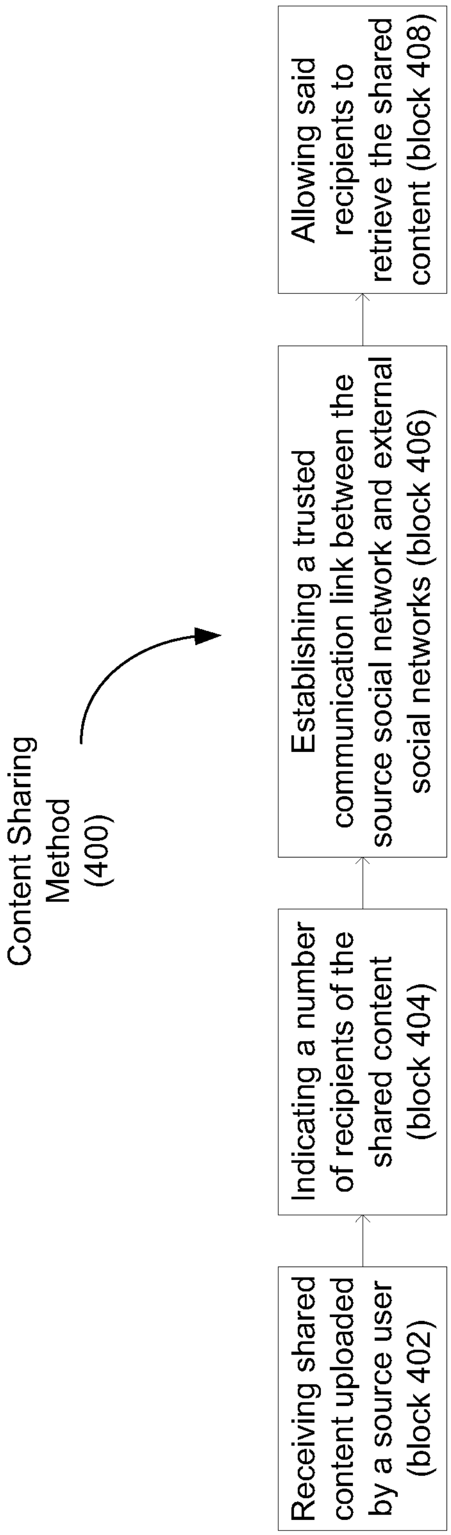
FIG. 4 is a flowchart showing an illustrative method for sharing content between users on different social networks, according to one exemplary embodiment of the principles described herein.

FIG. 4 is a flowchart showing an illustrative method (400) for sharing content between users in different social networks. According to certain illustrative examples, the method (400) includes: receiving (block 402) shared content uploaded by a source user to the source social network; indicating (block 404) a number of recipients of the shared content; establishing (block 406) a trusted communication link between the source social network and the external social networks; and allowing (block 408) the recipients to retrieve the shared material.

Figure 5:
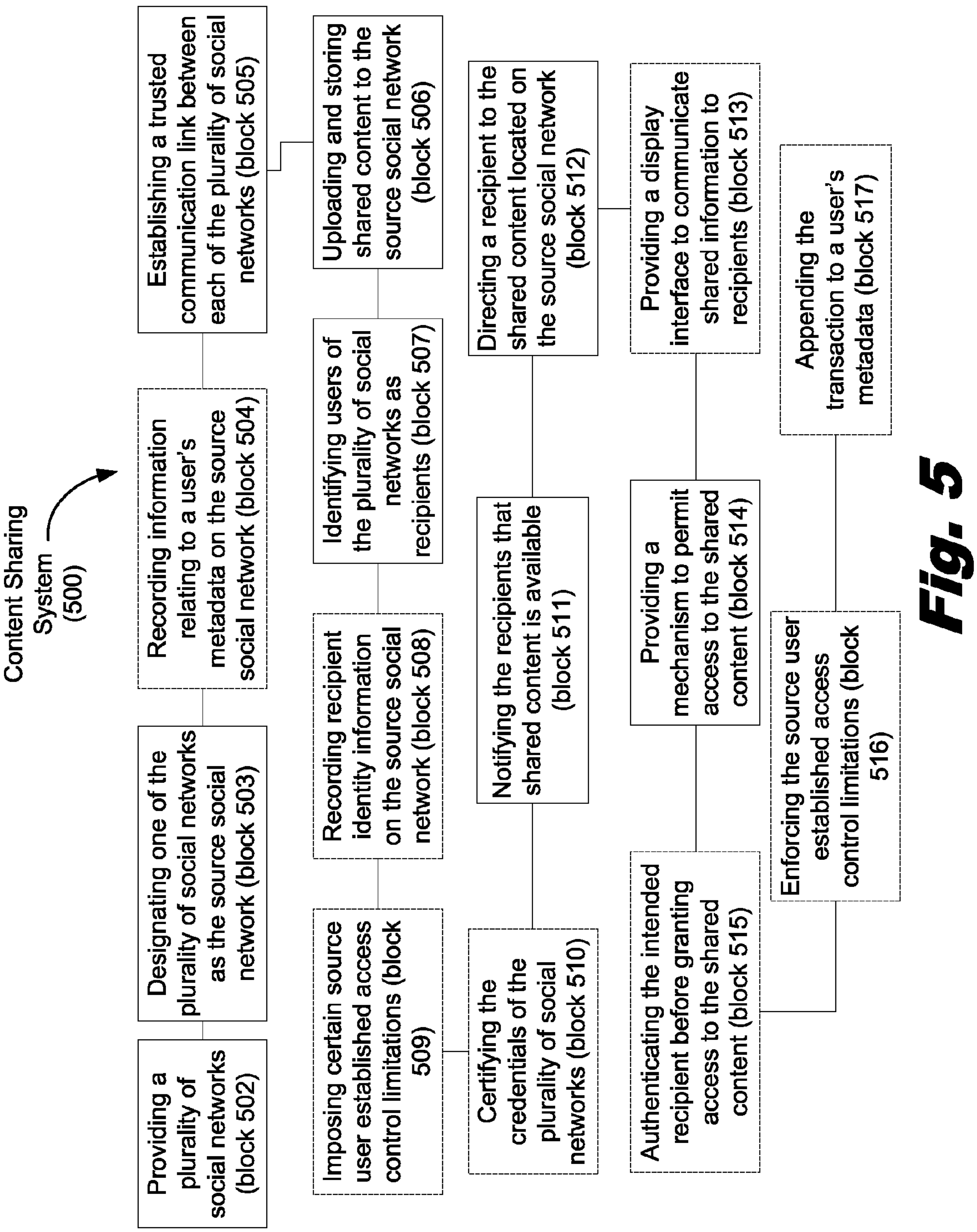
FIG. 5 is a flowchart showing another illustrative method for sharing content between users on different social networks, according to one exemplary embodiment of the principles described herein.

FIG. 5 is a flowchart showing another illustrative method for sharing content between users in different social networks (500). According to certain illustrative examples, the method includes, providing (block 502) a plurality of social networks wherein said plurality of social networks are configured to share, manage, and store selected shared content, designating (block 503) one of said plurality as a source social network, establishing (block 505) a trusted communication link between each of the plurality of social networks, uploading and storing (block 506) content to be shared to the source social network, identifying (block 507) users of the plurality of social networks as recipients, sharing (block 511) notifying the recipients that shared content is available, directing (block 512) recipients to the shared content located on the source social network, and providing (block 514) a module to permit access to the shared content.

In certain examples, the method (500) may further include recording (block 504) information relating to a user's metadata on the source social network, recording (block 508) user identify information on the source social network, imposing (block 509) certain source user established access control limitations, certifying (block 510) the credentials of the plurality of social networks, providing (block 513) a display interface to communicate shared information to an recipient, authenticating (block 515) the recipient before granting access to the shared content, enforcing (block 516) the source user established access control limitations, and appending (block 517) the metadata to a user's existing metadata.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for sharing content between users of different social networks, the method comprising:

in a source social network implemented by at least one processor, receiving shared content with an indication of a number of recipients of the shared content, wherein the shared content and the indication of the number of recipients of the shared content are part of a single message, wherein said shared content with said indication of said number of recipients is uploaded by a source user, and wherein the source user defines access rights for one or more of the recipients indicating whether the corresponding recipient has edit rights or read-only rights for the shared content;

storing the shared content and identifying information for each of the recipients on the source social network;

generating a navigating link which is provided to the recipients and directs the recipients to a location of the shared content on the source social network;

establishing a trusted communication link between the source social network and at least one external social network, wherein the source social network will authenticate received credentials of the at least one external social network and conditionally grant access to the shared content based on authenticity of the credentials of the at least one external social network requesting access;

in addition to authenticating credentials of at least one external social network, authenticating a user requesting the shared content as being one of the designated recipients;

enabling an authenticated requested user to retrieve the shared content from the source social network using the at least one external social network via the trusted communication link according to the defined access rights of the authenticated requesting user; and maintaining metadata about the authenticated requesting user at the source social network, wherein metadata regarding access of the shared content is appended to the metadata for the authenticated requesting user.

2. The method of claim 1, further comprising:

enforcing, by the source social network, access control limitations for at least one of the number of recipients.

3. The method of claim 1, further comprising:

identifying individual users of the at least one external social network;

providing identity information of the individual users of the at least one external social network to the source user; and enabling the source user to select at least one of the individual users of the at least one external social network as one of the number of recipients.

4. The method of claim 1, further comprising:

verifying that the at least one external social network is authorized to access the shared content; and prohibiting any unauthorized social network from accessing the shared content.

5. The method of claim 1, further comprising:

notifying the number of recipients that shared content is accessible to the number of recipients with the at least one external social network via the trusted communication link.

6. The method of claim 5, further comprising:

providing the number of recipients with information relating to a context of the shared content with the at least one external social network via the trusted communication link.

7. The method of claim 1, further comprising:

providing a navigating link to the number of recipients that directs each said recipient to a location of the shared content on the source social network.

8. The method of claim 1, further comprising:

for each user of the at least one external social network attempting to access the shared content, determining whether that user is one of the number of recipients; and preventing any unauthorized user from accessing the shared content.

9. The method of claim 8, further comprising:

notifying the source user when an unauthorized user attempts to access the shared content.

10. The method of claim 1, further comprising:

recording and storing metadata of the shared content; and appending and storing the metadata of the shared content to existing metadata for the source user and the number of recipients.

11. A system, comprising:

at least one processor; and a memory communicatively coupled to the at least one processor, the memory comprising executable code that causes the at least one processor, when executing the executable code, to:

implement a source social network;

receive shared content with an indication of a number of recipients of the shared content, wherein the shared content and the indication of the number of recipients of the shared content are part of a single message, wherein said shared content with said indication of said number of recipients is uploaded by a source user;

store the shared content and identifying information for each of the recipients on the source social network;

generate a navigating link which is provided to the recipients and directs the recipients to a location of the shared content on the source social network;

establish a trusted communication link between the source social network and at least one external social network, wherein the source social network will authenticate received credentials of the at least one external social network and conditionally grant access to the shared content based on authenticity of the credentials of the at least one external social network requesting access;

in addition to authenticating credentials of at least one external social network, authenticate a user requesting the shared content as being one of the designated recipients;

enable an authenticated requested user to retrieve the shared content from the source social network via the trusted communication link according to the defined access rights of the authenticated requesting user, in which the trusted communication link identifies credentials of the external social network and conditionally grants access to the shared content by the external social network based on the credentials; and maintaining metadata about the authenticated requesting user at the source social network, wherein metadata regarding access of the shared content is appended to the metadata for the authenticated requesting user.

12. The system of claim 11, wherein the trusted communication link is configured to authorize the recipients to access the shared content via the at least one external social network.

13. The system of claim 11, wherein the executable code further causes the at least one processor to:

identify individual users of the at least one external social network;

collect and record a unique user identifier corresponding to the individual users of the at least one external social network;

provide an identity of the individual users of the at least one external social network to the source user; and the source user to select a number of the individual users as the number of recipients.

14. The system of claim 11, wherein the executable code further causes the at least one processor to:

identify individual users of the at least one external social network as the number of recipients; and prohibit any unauthorized users from accessing the shared content.

15. The system of claim 14, wherein the executable code further causes the at least one processor to notify the source user of when an unauthorized user attempts to access the shared content.

16. The system of claim 11, wherein the executable code further causes the at least one processor to notify the number of recipients that shared content is available to the recipients through the at least one external social network via the trusted communication link.

17. The system of claim 11, wherein the executable code further causes the at least one processor to:

record metadata pertaining to a context of the shared content; and append the metadata pertaining to the context of the shared content to already existing metadata user history files for the source user and the number of recipients.

18. A computer program product for sharing content between users in different social networks, the computer program product comprising:

a non-transitory computer readable storage medium having computer program readable code embodied therewith, the computer readable program code comprising:

computer readable program code configured to implement a source social network;

computer readable program code configured to receive shared content with an indication of a number of recipients of the shared content, wherein the shared content and the indication of the number of recipients of the shared content are part of a single message, wherein said shared content with said indication of said number of recipients is uploaded by a source user, and wherein the source user defines access rights for one or more of the recipients indicating whether the corresponding recipient has edit rights or read-only rights for the shared content;

computer readable program code configured to store the shared content and identifying information for each of the recipients on the source social network;

computer readable program code configured to generate a navigating link which is provided to the recipients and directs the recipients to a location of the shared content on the source social network;

computer readable program code configured to establish a trusted communication link between the source social network and at least one external social network, wherein the source social network will authenticate received credentials of the at least one external social network and conditionally grant access to the shared content based on authenticity of the credentials of the at least one external social network requesting access;

computer readable program code configured to, in addition to authenticating credentials of at least one external social network, authenticating a user requesting the shared content as being one of the designated recipients;

computer readable program code configured to enable an authenticated requesting user to retrieve the shared content from the source social network via the trusted communication link according to the defined access rights of the authenticated requesting user; and computer readable program code configured to maintain metadata about the authenticated requesting user at the source social network, wherein metadata regarding access of the shared content is appended to the metadata for the authenticated requesting user.

19. The computer program product of claim 18, said computer readable program code further comprising computer readable program code configured to:

identify individual users of the at least one external social network;

collect and record a unique user identifier corresponding to the individual users of the at least one external social network;

provide an identity of the individual users of the at least one external social network to the source user; and enable the source user to select a number of the individual users as the number of recipients.

20. The computer program product of claim 18, said computer readable program code further comprising computer readable program code configured to notify the number of recipients that shared content is accessible to the number of recipients with the at least one external social network via the trusted communication link.

21. The method of claim 1, further comprising storing the shared content and identifying information for each of the recipients on the source social network.

* * * * *